Patented Aug. 27, 1940

2,212,519

UNITED STATES PATENT OFFICE 2,212,519

INSECTICIDE

William K. Griesinger, Lansdowne, Pa., assignor to The Atlantic Refining Company, Philadelphia, Pa., a corporation of Pennsylvania No Drawing. Application December 4, 1937, Serial No. 178,089

5 Claims. (Cl. 167—34)

The present invention relates to insecticides and fungicides and is designed to provide a more effective toxic compound than heretofore provided without burning or injury to the foliage of plants, shrubs or trees treated therewith.

The principal feature of this invention resides in combining organic bases of toxic nature with relatively low molecular weight, water-soluble petroleum sulfonic acids to produce water-soluble insecticides of high toxicity and a high degree of wetting and spreading power. Among the organic bases and alkaloids which may be employed in producing my insecticide are nicotine, coniine, pilocarpine, dipyridyl, piperidine, pyridylpiperidine, dipiperidine, anabasine and tolylpyrrolidine. The sulfonic acids which may be combined with the organic bases are preferably those derived from the acid sludge from the sulfuric acid treatment of low boiling petroleum fractions such as gasoline, kerosine and gas oil. These sulfonic acids are water-soluble and have molecular weights ranging from about 160 to about 325.

The organic base sulfonates, and particularly the water-soluble sulfonates of the alkaloids such as nicotine, are preferably applied to foliage in the form of aqueous solutions by spraying. The sulfonate concentration in the aqueous solution may be varied as desired and concentrations of the order 1–300; 1–500; 1–800; 1–1000; 1–1500; 1–2500; and 1–3500 have been found suitable for the extermination of various insect pests, such as aphids, thrips and leaf hoppers.

The sulfonate insecticides of the present invention, when employed in aqueous solution, have unusual and remarkable spreading and wetting qualities, both with respect to foliage and insects. It is therefore unnecessary to use auxiliary spreading or wetting agents such as soaps in order to obtain maximum coverage and thorough penetration by the solution containing the toxic agent. Furthermore, the alkaloid, for example, nicotine, is more stable or firmly bound as the sulfonate than as the sulfate (Black leaf 40), or as the tannate, consequently the nicotine is liberated more slowly, under normal atmospheric conditions, and therefore gives a longer period of residual toxicity on the foliage. The water-soluble nicotine sulfonates, in addition to being relatively non-irritating to workmen using same, also have better adhesive qualities for foliage than other nicotine compounds employed heretofore.

The preparation of my insecticidal compositions may be further illustrated by the following examples:

(1) A cracked gas oil containing aromatic hydrocarbons, naphthenic hydrocarbons and olefines, and having an A. P. I. gravity of 24° and a distillation range of 300° F. to 585° F., was sulfonated by treatment with 98% sulfuric acid. From the acid sludge resulting from the sulfonation treatment there was extracted a substantial quantity of water-soluble sulfonic acids having an average molecular weight of 298 and an acid value of 188 mg. KOH per gm. To these sulfonic acids, in aqueous solution, was added sufficient nicotine (40% solution) to neutralize the sulfonic acids and to produce a substantially neutral, water-soluble nicotine sulfonate. By evaporation of water from the aqueous nicotine sulfonate solution, there was produced a pasty mass of nicotine sulfonate containing little or no water. The nicotine sulfonate may be utilized or marketed either in the form of an aqueous solution or as a paste.

(2) Petroleum sulfonic acids similar to those described in Example 1, in aqueous solution, were neutralized with an aqueous lime slurry (calcium oxide and hydroxide) and the water-soluble calcium sulfonates so formed were separated from any excess calcium hydroxide. To the aqueous solution of calcium sulfonates was added sufficient nicotine sulfate to convert the calcium sulfonate into water-soluble nicotine sulfonate and water-insoluble calcium sulfate. The insoluble calcium sulfate was separated from the aqueous solution of nicotine sulfonate and the latter solution was concentrated by evaporation of water therefrom. In lieu of employing lime as a neutralizing agent, other alkaline earth oxides or hydroxides may be utilized; and other water-soluble nicotine salts may be used in lieu of nicotine sulfate.

It will be understood that the above examples are given by way of illustration only and are not to be construed as limiting my invention.

For brevity, in the appended claims the term "nicotine" is to be understood to comprehend nicotine and equivalent alkaloids or toxic organic bases.

What I claim is:

1. In the manufacture of an insecticidal composition, the steps comprising sulfonating a relatively low boiling petroleum fraction, extracting water-soluble sulfonic acids from the sludge resulting from the sulfonation, neutralizing the extracted sulfonic acids with an alkaline earth hydroxide to form water-soluble alkaline earth sulfonates, treating the alkaline earth sulfonates with a water-soluble nicotine salt to form water-soluble nicotine sulfonate and water-insoluble alkaline earth salt, and separating the nicotine sulfonate from said insoluble salt.

2. The method of claim 1 wherein the alkaline earth hydroxide is calcium hydroxide and the water-soluble nicotine salt is nicotine sulfate.

3. The method of claim 1 wherein the relatively low boiling petroleum fraction is of the group consisting of gasoline, kerosine and gas oil.

4. In a process of manufacturing insecticidal compositions from water-soluble petroleum sulfonic acids and nicotine, the steps which comprise forming a water-soluble alkaline earth sulfonate and reacting said sulfonate with a water-soluble nicotine salt.

5. In a process of manufacturing insecticidal compositions from water-soluble petroleum sulfonic acids and nicotine, the steps which comprise forming a water-soluble calcium sulfonate and reacting said sulfonate with nicotine sulfate.

WILLIAM K. GRIESINGER.